(12) United States Patent
Foster et al.

(10) Patent No.: US 9,291,199 B2
(45) Date of Patent: Mar. 22, 2016

(54) SLIDING SUPPORTS AND BEARING BALL RETAINERS

(75) Inventors: Samuel Foster, Milton Keynes (GB); Peter William Bayles, Northampton (GB)

(73) Assignee: Accuride International Limited, Northampton (GB)

( * ) Notice: Subject to any disclaimer, the term of this patent is extended or adjusted under 35 U.S.C. 154(b) by 78 days.

(21) Appl. No.: 13/819,378

(22) PCT Filed: Aug. 22, 2011

(86) PCT No.: PCT/GB2011/001257
§ 371 (c)(1),
(2), (4) Date: May 17, 2013

(87) PCT Pub. No.: WO2012/025717
PCT Pub. Date: Mar. 1, 2012

(65) Prior Publication Data
US 2014/0348447 A1    Nov. 27, 2014

(30) Foreign Application Priority Data
Aug. 27, 2010  (GB) .................................. 1014390.7

(51) Int. Cl.
*F16C 33/38* (2006.01)
*A47B 88/10* (2006.01)
(Continued)

(52) U.S. Cl.
CPC ............. *F16C 33/3818* (2013.01); *A47B 88/10* (2013.01); *F16C 33/3831* (2013.01);
(Continued)

(58) Field of Classification Search
CPC ........ A47B 88/04; A47B 88/08; A47B 88/10; A47B 88/12; A47B 88/14; A47B 2210/0002; A47B 2210/0008; A47B 2210/001; A47B 2210/17; A47B 2210/0029; A47B 2210/0032; A47B 2210/0035; A47B 2210/0037; A47B 2210/004
USPC .......... 312/334.1, 334.6, 334.7, 334.8, 334.9, 312/334.11, 334.13, 334.15, 334.16, 312/334.17, 334.32, 334.33, 334.36, 312/334.37, 334.38, 334.25, 334.26; 384/19, 51, 527, 463
See application file for complete search history.

(56) References Cited

U.S. PATENT DOCUMENTS 2,678,854 A * 5/1954 Card .............................. 384/18
3,455,616 A * 7/1969 George et al. ................. 384/520
(Continued)

FOREIGN PATENT DOCUMENTS

DE          3434197 A1    3/1986
DE     102009022267 A1   12/2009
(Continued)

OTHER PUBLICATIONS

International Search Report completed Jan. 22, 2014 in corresponding International Application No. PCT/GB2011/001257 (9 pages).
(Continued)

*Primary Examiner* — Andrew Roersma
(74) *Attorney, Agent, or Firm* — Andrew J. Anderson, Esq.; Harter Secrest & Emery LLP (57) ABSTRACT

The present invention relates to sliding supports and particularly sliding supports having two elongate members of channel section and a locating assembly positioned therebetween. The locating assembly includes a plurality of bearing balls and a plurality of contact elements, and is capable of functioning without the use of grease or additional lubrication. The sliding support is particularly suitable for use in harsh environments.

23 Claims, 6 Drawing Sheets

(51) Int. Cl.
*F16C 33/66* (2006.01)
*F16C 33/40* (2006.01)
*F16C 33/44* (2006.01)
*F24C 15/16* (2006.01)
*F16C 29/04* (2006.01)
*A47B 88/14* (2006.01)

(52) U.S. Cl.
CPC ............ *F16C33/3887* (2013.01); *F16C 33/40* (2013.01); *F16C 33/44* (2013.01); *F16C 33/6696* (2013.01); *F24C 15/168* (2013.01); *A47B 88/14* (2013.01); *A47B 2210/0032* (2013.01); *A47B 2210/0035* (2013.01); *F16C 29/04* (2013.01); *F16C 2202/50* (2013.01); *F16C 2202/52* (2013.01); *F16C 2202/54* (2013.01); *F16C 2314/00* (2013.01); *F16C 2314/72* (2013.01); *F16C 2362/40* (2013.01)

(56) References Cited

U.S. PATENT DOCUMENTS

| | | | | |
|---|---|---|---|---|
| 3,712,694 | A * | 1/1973 | Smith | 384/520 |
| 3,790,239 | A * | 2/1974 | Laux et al. | 384/463 |
| 4,494,802 | A * | 1/1985 | Henson | 384/19 |
| 4,534,871 | A | 8/1985 | Johnson | |
| 4,749,242 | A * | 6/1988 | Rechberg | 312/333 |
| 4,906,110 | A * | 3/1990 | Van Wyk et al. | 384/463 |
| 5,230,570 | A | 7/1993 | Bursey, Jr. et al. | |
| 5,356,227 | A * | 10/1994 | Sibley et al. | 384/463 |
| 5,547,285 | A | 8/1996 | Hutzel et al. | |
| 5,622,434 | A | 4/1997 | Takahashi | |
| 5,927,858 | A * | 7/1999 | Agari | 384/45 |
| 6,254,210 | B1 | 7/2001 | Parvin | |
| 6,347,558 | B1 * | 2/2002 | Miyaguchi et al. | 74/424.71 |
| 6,352,367 | B1 * | 3/2002 | Konomoto et al. | 384/45 |
| 6,439,019 | B1 * | 8/2002 | Heimann et al. | 72/110 |
| 6,643,932 | B2 * | 11/2003 | Takagi et al. | 29/898.03 |
| 6,854,817 | B1 * | 2/2005 | Simon | 312/334.6 |
| 6,966,698 | B2 * | 11/2005 | Wu et al. | 384/49 |
| 7,146,869 | B2 * | 12/2006 | Miyaguchi et al. | 74/89.32 |
| 2007/0160313 | A1 * | 7/2007 | Kuo et al. | 384/51 |
| 2007/0211979 | A1 * | 9/2007 | Habibvand | 384/521 |
| 2008/0129169 | A1 * | 6/2008 | Daino et al. | 312/334.1 |
| 2008/0218046 | A1 * | 9/2008 | Rechberg | 312/334.11 |
| 2008/0253707 | A1 * | 10/2008 | Chen | 384/209 |
| 2009/0238503 | A1 * | 9/2009 | Liang et al. | 384/18 |
| 2011/0187253 | A1 * | 8/2011 | Jaehrling et al. | 312/334.1 |
| 2011/0194791 | A1 * | 8/2011 | Jahrling et al. | 384/26 |

FOREIGN PATENT DOCUMENTS

| | | |
|---|---|---|
| DE | 202011051895 U1 | 11/2011 |
| EP | 0665383 A1 | 8/1995 |
| EP | 0275080 A2 | 7/1998 |
| EP | 1803949 A1 | 7/2007 |
| EP | 2481990 A1 | 8/2012 |
| JP | H0560501 A | 3/1993 |
| WO | 2009150434 A1 | 12/2009 |
| WO | 2010/046456 A1 | 4/2010 |
| WO | 2010/049283 A1 | 5/2010 |

OTHER PUBLICATIONS

Written Opinion of the International Searching Authority completed Jan. 22, 2014 in corresponding International Application No. PCT/GB2011/001257 (12 pages).

* cited by examiner

SLIDING SUPPORTS AND BEARING BALL RETAINERS

FIELD OF THE INVENTION

The invention relates to sliding supports and, in particular, to bearing ball retainers therefor.

BACKGROUND OF THE INVENTION

Figure 1:
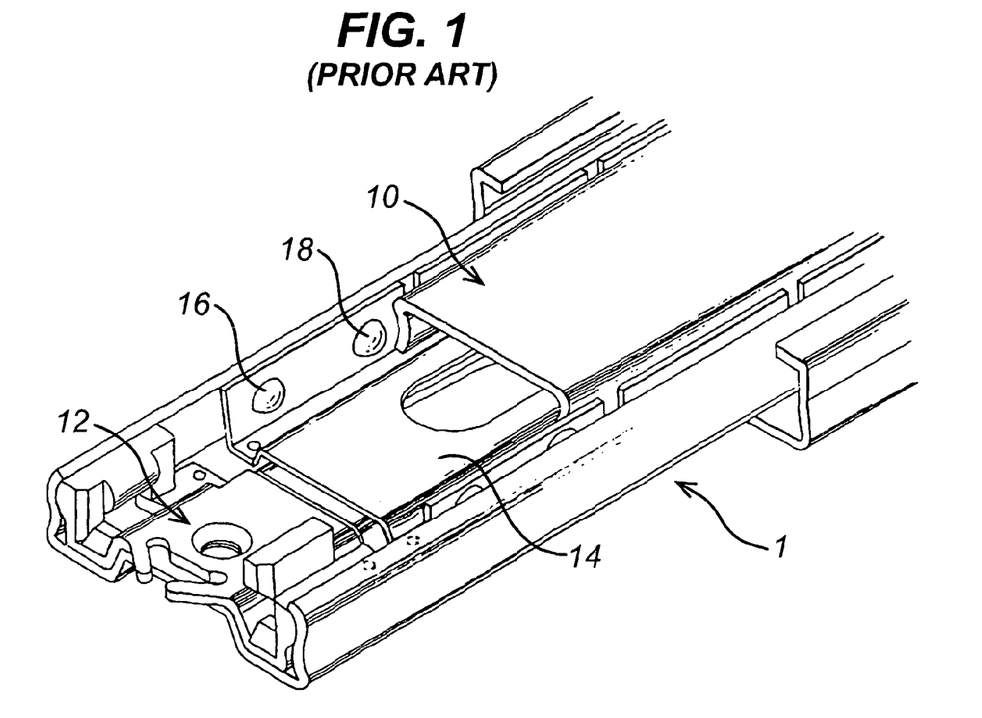
FIG. 1 is a perspective view of a sliding support according to the prior art.

It is known to provide sliding supports for use in, for example, furniture or appliances such as ovens and dishwashers. Such sliding supports have two (or more) elongate members, typically of shallow channel section, which slide one within the other, one of the members being secured to a first slidable article, and the other to a second article relative to which the first article is slidable. Sliding engagement between the members is typically provided by bearing balls retained by a retaining member located between the two elongate members. For example, FIG. 1 shows a drawer slide as disclosed in U.S. Pat. No. 6,254,210 B which includes first and second channel sectioned elongate members 10, 12 and a channel sectioned ball retainer 14 comprising a web and a pair of flanges. Apertures 16 are provided in the flanges for housing the bearing balls 18. Grease is applied around the balls to lubricate the slide. Such a sliding support is shown in FIG. 1.

Slides which rely on the application of grease to the balls are not suitable for use in aggressive environments which involve elevated or reduced temperatures and/or liquids such as cleaning agents and/or water because the grease is washed or burnt away and no longer functions as required.

Consequently, there is a need for a sliding support and a ball retainer which are capable of functioning without the traditional application of grease, in aggressive environments such as pyrolytic ovens, steam ovens, dishwashers, standard ovens and fridge freezers.

SUMMARY OF THE INVENTION

The present invention addresses this need by providing, in a first aspect:
a locating assembly for use with a sliding support comprising first and second elongate slide members slidable relative to one another in a first direction, wherein the locating assembly comprises:
a first plurality of bearing balls arranged with their centres aligned along a first axis parallel to the first direction,
a first plurality of contact elements, each contact element including at least one contact face, wherein adjacent of the first plurality of bearing balls are separated by a respective one of the first plurality of contact elements, and at least one of the contact elements is positioned such that at least one of its contact faces is in contact with one of the bearing balls at i) only a single contact point positioned on the first axis or ii) at least three contact points, wherein the at least three contact points are positioned with rotational symmetry about the first axis of at least order 3.

The at least one contact face may take one of a number of forms. For example, the at least one contact face may comprise a flat face, in which case the contact face is perpendicular to the first axis and in contact with the respective bearing ball at a single point on the first axis.

The at least one contact face may comprise a convex face, or may be formed from the outer surface of a cone, in which case the contact face is in contact with the respective bearing ball at a single point on the first axis.

Alternatively, the at least one contact face may be formed from the inner surface of a cone, in which case the contact face is in contact with the respective bearing ball at a plurality of points arranged in a circle around the first axis.

Alternatively, the contact face may comprise a concave surface, in which case the contact face is in contact with the respective bearing ball at a plurality of points all over its surface or arranged in a circle around the first axis.

Alternatively, the contact element may comprise a toroid or tube, in which case the contact face is in contact with the respective bearing ball at a plurality of points arranged in a circle around the first axis.

Alternatively, the contact face may take the form of a trident so that the contact face is in contact with the respective bearing ball at three points arranged with three-fold rotational symmetry around the first axis.

The above contact face shapes are examples and the invention is not limited to these specific face shapes.

The contact elements used in the present invention geometrically balance against the respective bearing ball, preventing the contact surface, ball and any guide rail from jamming against one another or all together.

Each of the contact elements may include a pair of contact faces, and each of the contact faces may be in contact with one of the bearing balls at one or at least three contact points positioned as described for the first of the contact faces, i.e. with one contact point on the first axis and/or at least three contact points spaced rotationally symmetrically around the first axis. The present invention also provides a sliding support comprising:
a first elongate slide member;
a second elongate slide member; and
the locating assembly of the present invention positioned between the first slide member and the second slide member to locate and align the first slide member and the second slide member for sliding relative to one another in the first direction without contact therebetween.

The sliding support is for supporting any element or body required to be slidably mounted relative to another body.

The arrangement of the present invention means that the first and second elongate slide members can be aligned and located relative to one another with a single row of bearing balls and contact elements arranged between the first and second slide member.

However, the locating assembly may further comprise a second plurality of bearing balls arranged with their centres aligned along a second axis parallel to the first direction, and a second plurality of contact elements, each of the second contact elements including at least one contact face, wherein adjacent of the second plurality of bearing balls are separated by a respective one of the second plurality of contact elements, and at least one of the second plurality of contact elements is positioned such that its contact face is in contact with one of the second plurality of bearing balls at one or at least three contact points, wherein the contact points are positioned such that i) one contact point is positioned on the second axis and/or ii) at least three contact points are spaced rotationally symmetrically around the second axis.

Any description contained herein of the first plurality of bearing balls and contact elements can also apply to the corresponding arrangement of the second plurality of bearing balls and contact elements.

Because the bearing balls are only in contact with the contact elements in a minimised or rotationally symmetrically balanced area, there is no need for grease or further lubrication to be applied to the sliding support. Consequently, the sliding support can be used in harsh environments.

In addition, because the bearing balls are not held in a fixed position relative to the contact elements, the bearing balls and the contact elements can float relative to one another, and independently relative to the slide members. Consequently, the locating assembly is prevented from jamming in use.

The first elongate member may be of channel section defining a first web and first and second flanges. The second elongate member may be of channel section defining a second web and third and fourth flanges. The first plurality of bearing balls may be positioned between the first and third flanges, and the second plurality of bearing balls may be positioned between the second and fourth flanges.

Alternatively, the sliding support may further include an intermediate member. The first elongate member may be of channel section defining a first web and first and second flanges. The second elongate member may be of channel section defining a second web and third and fourth flanges. The intermediate member may be positioned between the first and second slide members. A locating assembly according to the invention including first and second parallel rows of bearing balls may be positioned between the first slide member and the intermediate member to locate and align the first slide member and the intermediate member for sliding without contact therebetween. A further locating assembly according to the invention including third and fourth parallel rows of ball bearings may be positioned between the second slide member and the intermediate member to locate and align the second slide member and the intermediate member for sliding without contact therebetween.

The first and second flanges may be offset relative to the third and fourth flanges in a direction parallel to the first and second webs. The intermediate member may have a cross-section comprising a third channel section connected to a fourth channel section by a connecting member. The third channel section may be defined by a third web and fifth and sixth flanges and the fourth channel section may be defined by a fourth web and seventh and eighth flanges. The fifth flange may be connected to the seventh flange by the connecting member.

The cross-sectional profile of each of the first to eighth flanges may be shaped to provide half of a ball engaging channel such that the rows of bearing balls are retained between the respective first and second slide members and/or intermediate member in a plurality of ball channels.

In a preferred embodiment, each of the plurality of contact elements may comprise a cylindrical portion. The end faces of the cylinder form the pair of contact faces. The axis of the cylindrical portion is arranged parallel to the first direction, and preferably along the first axis. The end faces of the cylinder may be flat, or of any of the other forms discussed above.

Each cylindrical portion may have a constant diameter along its length. Alternatively, each cylindrical portion may have a reduced diameter section close to its centre.

The contact elements may be held in place between the bearing balls by the slide members and/or any intermediate members, without the need for an additional support portion. Alternatively, the locating assembly may further comprise a support portion for maintaining the contact elements in position and alignment relative to one another. The support portion may be channel sectioned.

The support portion and the contact elements may be unitary, i.e. they may be formed as one piece from the same material.

In a particular embodiment, the support portion and the contact elements are formed from a channel shaped member having a web and a pair of flanges. Each flange has an increased thickness relative to the web and each flange includes a plurality of apertures therethrough such that a cross section of the flange forms the contact faces of the contact elements and the apertures separate the contact elements from one another. In use, the bearing balls are located within the apertures. Each flange may, for example, have a circular, square, rhomboidal or cross-shaped cross-section.

Alternatively, the support portion may be formed separately from the contact elements and the contact elements may be held by the support portion.

The contact elements may be formed from any self-lubricating material such as sheet, cast or sintered bearing materials with lubricating additives, such as carbon, graphite, boron nitride, bronze, brass, pom, ptfe and alloys or compounds thereof. Suitable materials include: Graphite, Carbon graphite, Resin impregnated carbon, Metal-impregnated carbon, SiC/C composites, Inorganic compound impregnated carbon, B4C/C composites, Impermeable carbon graphite, Resin bonded carbon, Metal bonded carbon, Grapalloy (brand of graphite/metal alloy), Carbon, Diamond-like carbon, Copper alloy, Aluminium oxide, Boron nitride, Talc (compound of hydrated. magnesium silicate), Calcium fluoride, Cerium fluoride, Tungsten disulfide, Molybdenum disulfide, PTFE, PFPE, POM.

The self-lubricating material may be softer than the bearing ball. In use, friction between the bearing ball and the contact element may cause the lubricating substance to be deposited and spread into the bearing ball working environment such that lubrication of the slide is effected.

The support portion may be formed from sheet, cast or sintered material such as stainless steel with graphite coating or $SiO_2$ coating. Consequently, the support portion and the contact element could be formed from different materials. Such an arrangement has the advantage that the material chosen for the support portion could be optimised to provide strength to the locating assembly, whilst the material chosen for the contact elements could be optimised to provide lubricating properties.

Alternatively, when the support portion and the contact elements are unitary, the support portion would be formed from the same material as the contact elements.

In a particular embodiment, the support portion may be channel sectioned, including a flange and a pair of tubular webs. Each of the tubular webs may comprise a plurality of separated tubular portions. Each of the tubular portions may surround and grip a central section of each of the contact elements. The central section of each of the contact elements may be of reduced diameter relative to the end sections of each of the contact elements.

Each contact element may comprise a single unitary piece. Alternatively, each contact element may comprise a pair of pieces, wherein the first piece provides a first of the flat faces, and a second piece provides a second of the flat faces. Each of the pieces may comprise a first cylindrical portion having a first diameter and a second cylindrical portion having a second diameter.

Each contact element, or each piece of each contact element, may have a composite form, including a central strengthening portion formed of a first material, surrounded by an outer lubricating portion formed of a second material. The second material may be any of those listed above as suitable for the contact elements. The second material may be applied as a coating to the first material. The second material may be softer than the bearing ball.

The first and second slide members and any intermediate member may be made of steel, such as mild or stainless steel, or any other suitable material.

In a second aspect of the invention, there is provided a locating assembly for use with a sliding support comprising first and second elongate slide members slidable relative to one another in a first direction, wherein the locating assembly comprises:
- a plurality of bearing balls arranged in a first row and a plurality of bearing balls arranged in a second row parallel to the first row,
- a plurality of contact elements formed from a first material, wherein adjacent bearing balls in each row are separated by a respective one of the contact elements, and
- a support element formed from a second material different to the first material, for maintaining the contact elements in position and alignment relative to one another.

The present invention also provides a sliding support comprising:
- a first elongate slide member;
- a second elongate slide member; and
- the locating assembly of the present invention positioned between the first slide member and the second slide member to locate and align the first slide member and the second slide member for sliding relative to one another in the first direction without contact therebetween.

The first elongate member may be of channel section defining a first web and first and second flanges. The second elongate member may be of channel section defining a second web and third and fourth flanges. The first row of bearing balls may be positioned between the first and third flanges, and the second row of bearing balls may be positioned between the second and fourth flanges.

Alternatively, the sliding support may further include an intermediate member. The first elongate member may be of channel section defining a first web and first and second flanges. The second elongate member may be of channel section defining a second web and third and fourth flanges. The intermediate member may be positioned between the first and second slide members. The locating assembly including the first and second parallel rows of bearing balls may be positioned between the first slide member and the intermediate member to locate and align the first slide member and the intermediate member for sliding without contact therebetween. A further locating assembly including third and fourth parallel rows of ball bearings may be positioned between the second slide member and the intermediate member to locate and align the second slide member and the intermediate member for sliding without contact therebetween.

The first and second flanges may be offset relative to the third and fourth flanges in a direction parallel to the first and second webs. The intermediate member may have a cross-section comprising a third channel section connected to a fourth channel section by a connecting member. The third channel section may be defined by a third web and fifth and sixth flanges and the fourth channel section may be defined by a fourth web and seventh and eighth flanges. The fifth flange may be connected to the seventh flange by the connecting member.

The cross-sectional profile of each of the first to eighth flanges may be shaped to provide half of a ball engaging channel such that the rows of bearing balls are retained between the respective first and second slide members and/or intermediate member in a plurality of ball channels.

The support portion may be channel sectioned. The contact elements may be held by the support portion.

The contact elements may be formed from any self-lubricating material such as sheet, cast or sintered bearing materials with lubricating additives, such as carbon, graphite, boron nitride, bronze, brass, pom, ptfe and alloys thereof. Suitable materials include: Graphite, Carbon graphite, Resin impregnated carbon, Metal-impregnated carbon, SiC/C composites, Inorganic compound impregnated carbon, B4C/C composites, Impermeable carbon graphite, Resin bonded carbon, Metal bonded carbon, Grapalloy (brand of graphite/metal alloy), Carbon, Diamond-like carbon, Copper alloy, Aluminium oxide, Boron nitride, Talc (compound of hydrated. magnesium silicate), Calcium fluoride, Cerium fluoride, Tungsten disulfide, Molybdenum disulfide, PTFE, PFPE, POM.

The support portion may be formed from sheet, cast or sintered material such as stainless steel with graphite coating or $SiO_2$ coating. Consequently, the support portion and the contact element are formed from different materials. Such an arrangement has the advantage that the material chosen for the support portion could be optimised to provide strength to the locating assembly, whilst the material chosen for the contact elements could be optimised to provide lubricating properties.

In a particular embodiment, the support portion may be channel sectioned, including a flange and a pair of tubular webs. Each of the tubular webs may comprise a plurality of separated tubular portions. Each of the tubular portions may surround and grip a central section of each of the contact elements. The central section of each of the contact elements may be of reduced diameter relative to the end sections of each of the contact elements.

Each contact element may comprise a single unitary piece. Alternatively, each contact element may comprise a pair of pieces, wherein the first piece provides a first of the flat faces, and a second piece provides a second of the flat faces. Each of the pieces may comprise a first cylindrical portion having a first diameter and a second cylindrical portion having a second diameter.

Each contact element, or each piece of each contact element, may have a composite form, including a central strengthening portion formed of a first material, surrounded by an outer lubricating portion formed of a second material. The second material may be any of those listed above as suitable for the contact elements.

The first and second slide members and any intermediate member may be made of steel, such as mild or stainless steel, or any other suitable material.

In a third aspect of the invention, there is provided:
- a locating assembly for use with a sliding support comprising first and second elongate slide members slidable relative to one another in a first direction, wherein the locating assembly comprises:
- a plurality of bearing balls arranged with their centres aligned along a first axis parallel to the first direction,
- a plurality of contact elements, each contact element including at least one contact face, wherein adjacent of the plurality of bearing balls are separated by a respective one of the plurality of contact elements, and at least one of the contact elements is formed from a self-lubricating material which, in use, deposits and spreads a lubricating substance into the working environment of the locating assembly.

In a fourth aspect of the invention, there is provided:
A sliding support comprising:
- first and second elongate slide members slidable relative to one another in a first direction; and
- a locating assembly comprising:
- a plurality of bearing balls arranged with their centres aligned along a first axis parallel to the first direction, and at least one lubricating element, each lubricating element including at least one contact face which is formed from a self-lubricating material and which contacts a movable part of the sliding support or locating assembly such that, in use, the lubricating element deposits a lubricating substance into the working environment of the bearing balls.

In preferred embodiments, the movable part may comprise the first or second elongate slide member, or at least one of the plurality of bearing balls.

In both the third and fourth aspects of the invention, the self-lubricating material may comprise sheet, cast or sintered bearing materials with lubricating additives, such as carbon, graphite, boron nitride, bronze, brass, pom, ptfe and alloys or compounds thereof. Suitable materials include: Graphite, Carbon graphite, Resin impregnated carbon, Metal-impregnated carbon, SiC/C composites, Inorganic compound impregnated carbon, B4C/C composites, Impermeable carbon graphite, Resin bonded carbon, Metal bonded carbon, Grapalloy (brand of graphite/metal alloy), Carbon, Diamond-like carbon, Copper alloy, Aluminium oxide, Boron nitride, Talc (compound of hydrated. magnesium silicate), Calcium fluoride, Cerium fluoride, Tungsten disulfide, Molybdenum disulfide, PTFE, PFPE, POM. In use, friction between the bearing ball and the contact element causes the lubricating substance to be deposited and spread into the bearing ball working environment such that lubrication of the slide is effected.

Other features of the first and second aspects of the invention can also be included in the third aspect of the invention.

BRIEF DESCRIPTION OF THE DRAWINGS

By way of example, embodiments of sliding supports and locating assemblies according to the invention will now be described with reference to the accompanying drawings, in which:—

DETAILED DESCRIPTION OF THE DRAWINGS

As mentioned above, FIG. 1 shows a perspective view of a prior art sliding support generally indicated at 1.

Figure 2:
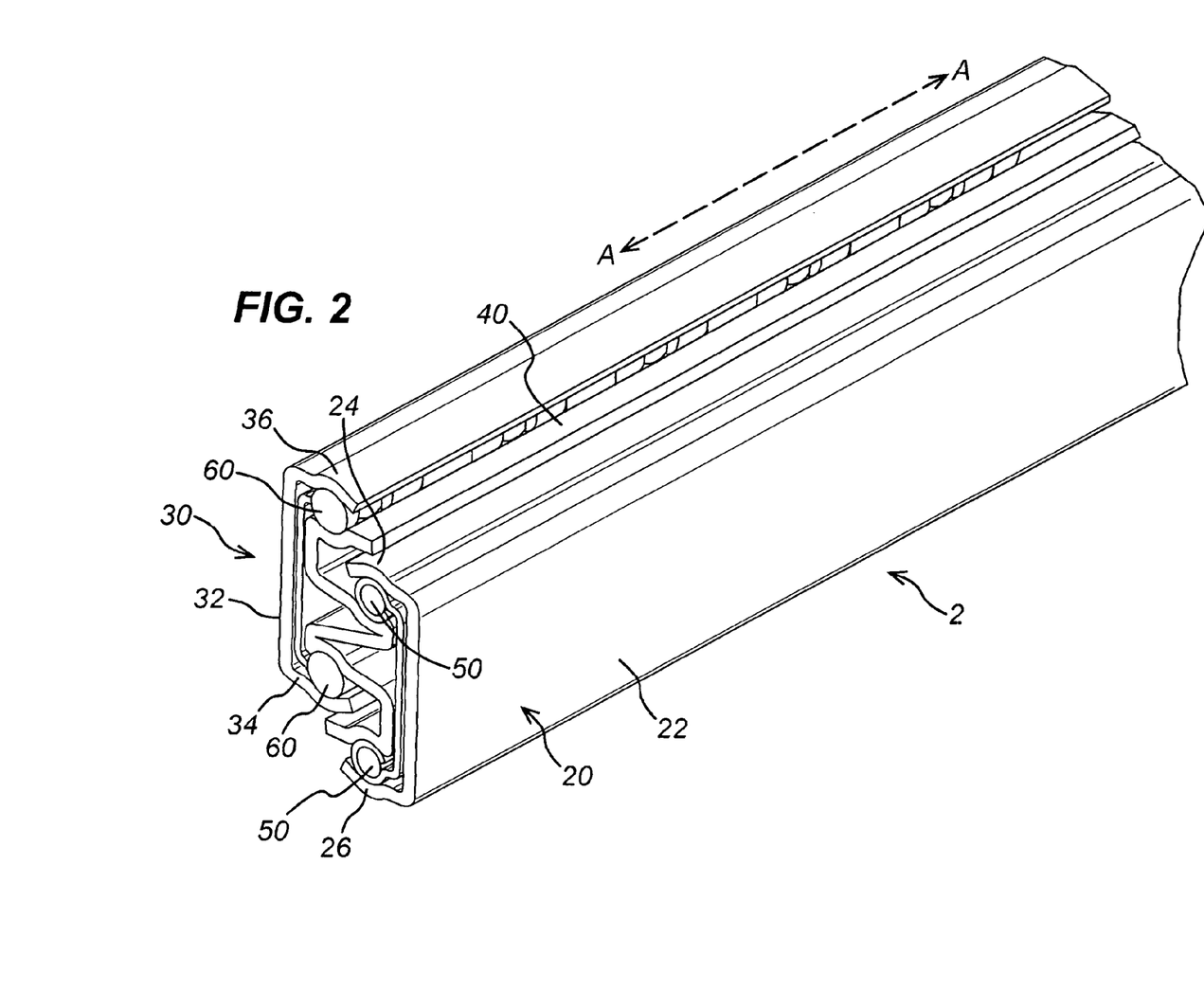
FIG. 2 is a perspective view of a sliding support according to a first embodiment of the present invention.
Figure 3:
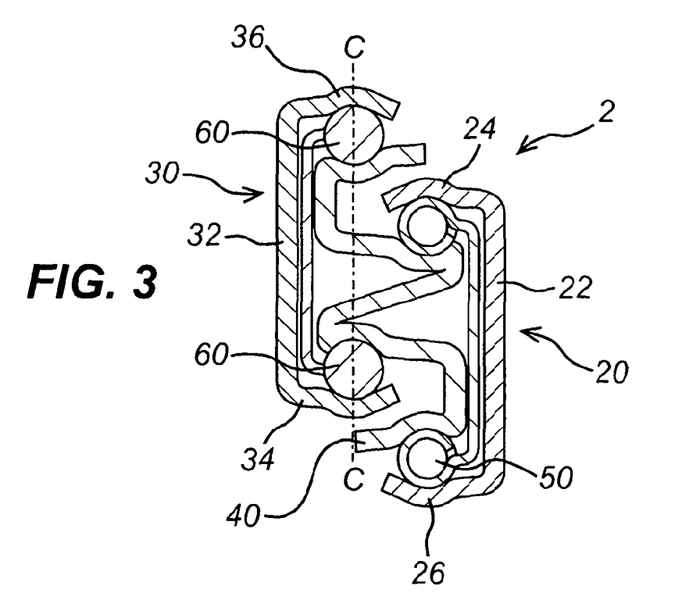
FIG. 3 is a sectional view of the sliding support of FIG. 2.

According to an embodiment of the present invention as shown in FIGS. 2 and 3, there is provided a sliding support 2 comprising a first elongate slide member 20 of channel section defining a first web 22 and first and second flanges 24, 26. The sliding support 2 also includes a second elongate slide member 30 of channel section defining a second web 32 and third and fourth flanges 34, 36. An intermediate member 40 is positioned between the first and second slide members 20, 30. A locating assembly 50 is positioned between the first slide member 20 and the intermediate member 40 to locate and align the first slide member 20 and the intermediate member 40 for sliding without contact therebetween. A further locating assembly 60 is positioned between the second slide member 30 and the intermediate member 40 to locate and align the second slide member 30 and the intermediate member 40 for sliding without contact therebetween. The first and second flanges 24, 26 are offset relative to the third and fourth flanges 34, 36 in a direction parallel to the first and second webs 22, 32. The intermediate member 40 has a cross-section comprising a third channel section connected to a fourth channel section by a connecting member arranged at an angle to the first and second webs 22, 32. The cross-sectional profile of each of the flanges of the first and second slide members and the intermediate member are shaped to provide half of a ball engaging channel such that rows of bearing balls forming part of the locating assembly can be retained between the respective members in a plurality of ball channels.

Figure 4:
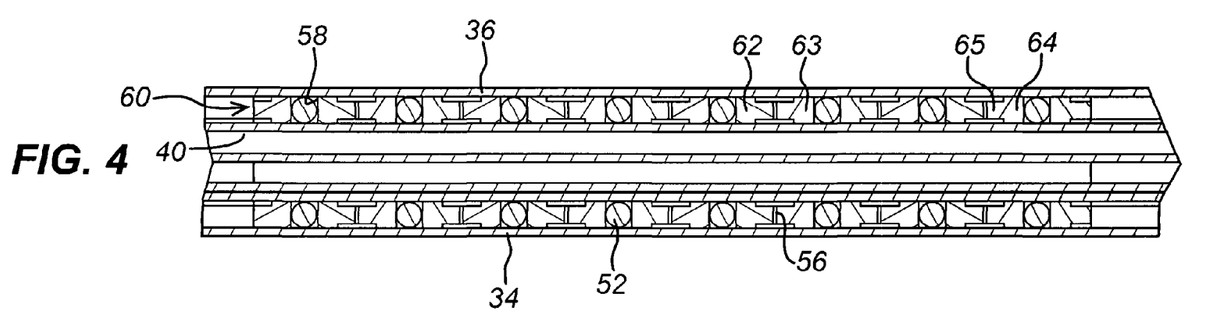
FIG. 4 is a view taken along line C-C in FIG. 3.

FIG. 4 shows how, in use, the locating assembly 60 is positioned between the second slide member 30 and the intermediate member 40.

Figure 5:
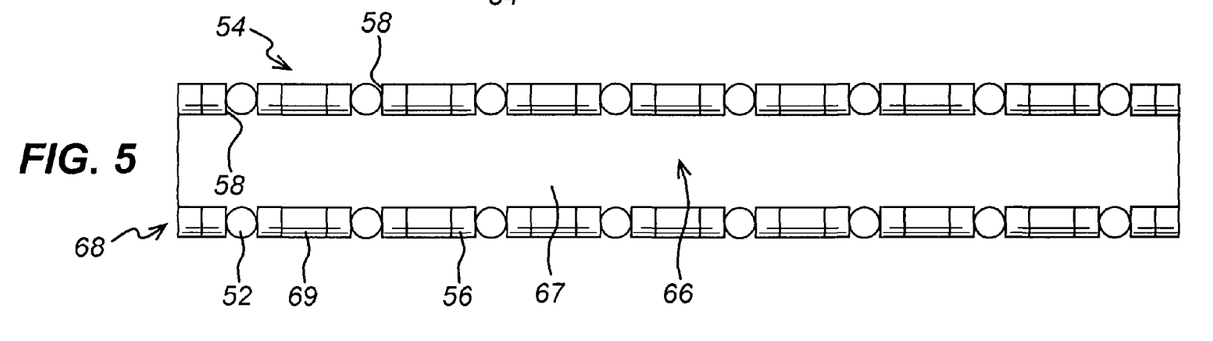
FIG. 5 is a view of the locating assembly of the sliding support of FIG. 2.
Figure 6:
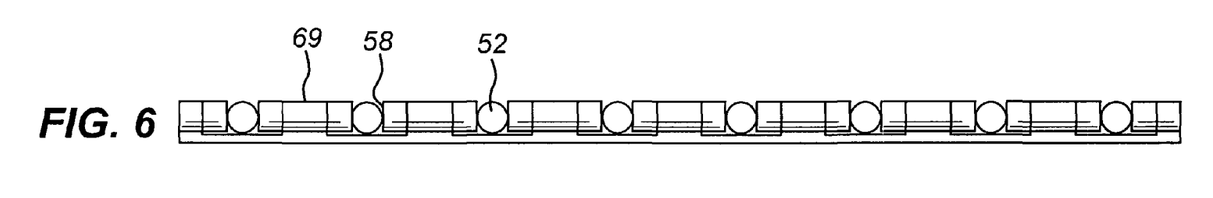
FIG. 6 is an alternate view of the locating assembly of the sliding support of FIG. 2.

FIGS. 5 and 6 show detailed views of each of the locating assembly 50 and 60. Each of the locating assembly 50 and 60 comprises two rows of bearing balls 52 arranged parallel to one another. A ball retainer 54 includes a plurality of contact elements 56, each of which includes a pair of flat faces 58. Adjacent bearing balls 52 in each row are separated by respective contact elements 56 of the ball retainer 54, and each contact element 56 is positioned such that each of the pair of flat faces 58 is in contact with one of the bearing balls 52. Each flat face is positioned perpendicular to the direction A-A (shown in FIG. 2) in which the slide members slide, and tangential to the surface of the bearing ball 52 with which the flat face 58 is in contact.

The bearing balls 52 and the contact elements 56 can float relative to one another, and independently relative to the slide members 20, 30. Consequently, the locating assembly 50 and 60 are prevented from jamming in use.

In the embodiment shown in FIGS. 4 to 6, each of the plurality of contact elements 56 of the ball retainer 54 is generally cylindrical. The end faces of the cylinder 56 comprise the pair of flat faces 58. The axis of the cylindrical portion is arranged parallel to the first direction A-A.

As best seen in FIG. 4, each cylindrical contact element 56 is made up of two pieces 62, 63. The first piece 62 provides a first of the flat faces 58, and the second piece 63 provides a second of the flat faces 58. Each of the pieces 62, 63 comprises a first cylindrical portion 64 having a first diameter and a second cylindrical portion 65 having a second diameter.

The ball retainer 54 further comprises a support portion 66 for maintaining the contact elements 56 in position and alignment relative to one another. The support portion 66 is formed separately from, and of a different material to, the contact elements 56.

The support portion 66 is channel sectioned, including a flange 67 and a pair of tubular webs 68. Each of the tubular webs 68 comprises a plurality of separated tubular portions 69. Each of the tubular portions 69 surrounds and grips a central section of each of the contact elements 56. The central section of each of the contact elements 56 is of reduced diameter relative to the end sections of each of the contact elements 56.

In use, the first slide member 20 is fixedly mounted to a first body (not shown). The second slide member 30 is fixedly mounted to a second body (not shown) in relation to which the first body is to be slidable linearly.

FIGS. 7 to 10 show an alternative locating assembly 70 of the present invention. The locating assembly 70 could be used with the sliding support shown in FIGS. 2 and 3 in place of the locating assembly 50 and 60 shown therein.

The locating assembly 70 includes a plurality of bearing balls 72 arranged in first and second parallel rows. A ball retainer 74 includes a plurality of contact elements 76, each contact element 76 including a pair of flat faces 78. Adjacent bearing balls 72 in each row are separated by respective contact elements 76 of the ball retainer 78, and each contact element 76 is positioned such that each of the pair of flat faces 78 is in contact with one of the bearing balls 72. Each flat face is positioned perpendicular to the first direction and tangential to the surface of the bearing ball 72 with which the flat face 78 is in contact.

Because the bearing balls 72 are not held in a fixed position relative to the contact elements 76, the bearing balls 72 and the contact elements 76 can float relative to one another, and independently relative to the slide members 20, 30. Consequently, the locating assembly 70 do not jam in use.

The ball retainer 74 further comprises a support portion 79 for maintaining the contact elements 76 in position and alignment relative to one another. The support portion 79 and the contact elements 76 are unitary, i.e. they are formed as one piece from the same material.

Figure 7:
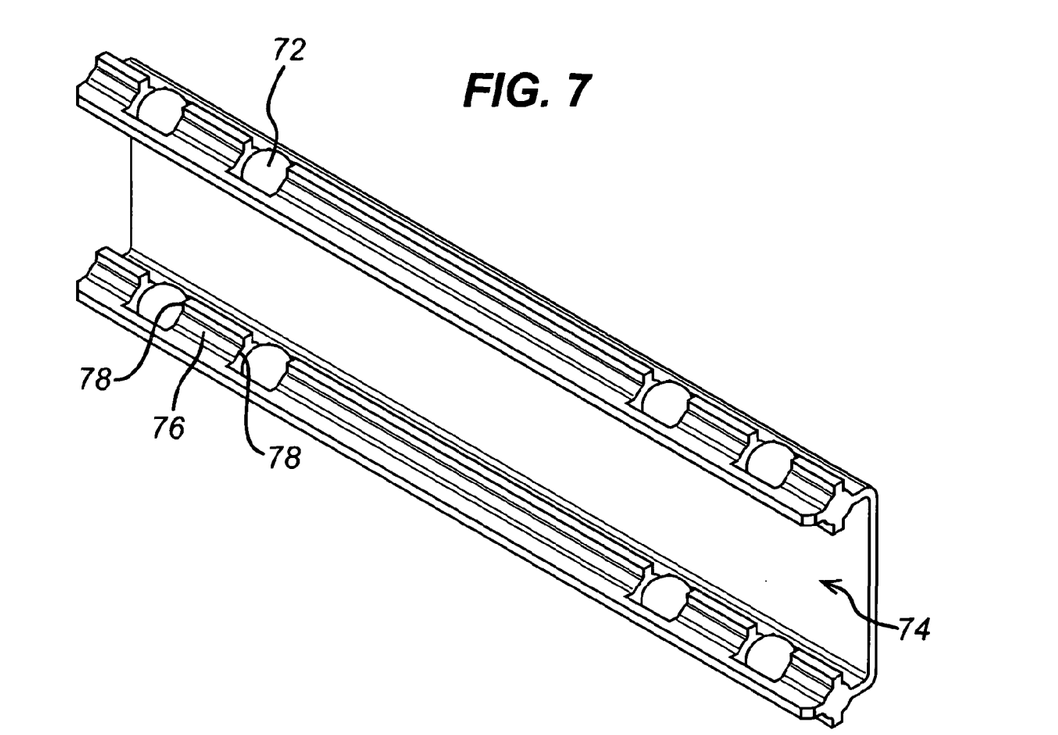
FIG. 7 is a perspective view of an alternative locating assembly for the sliding support of the present invention.
Figure 8:
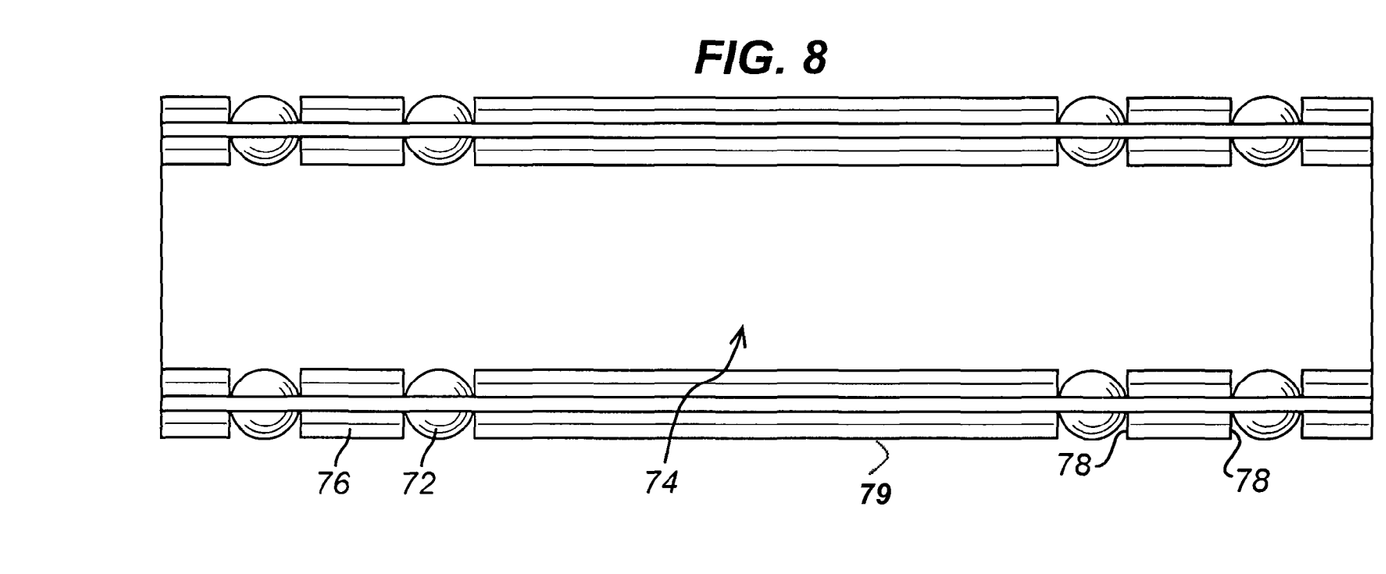
FIG. 8 is a side view of the locating assembly of FIG. 7.
Figure 9:
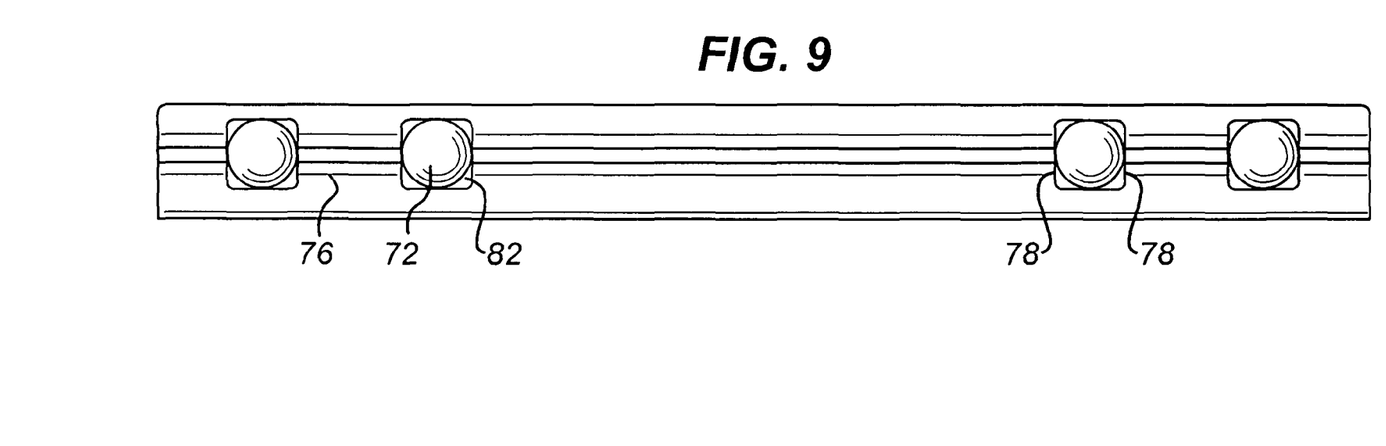
FIG. 9 is a view from another side of the locating assembly of FIG. 7.
Figure 10:
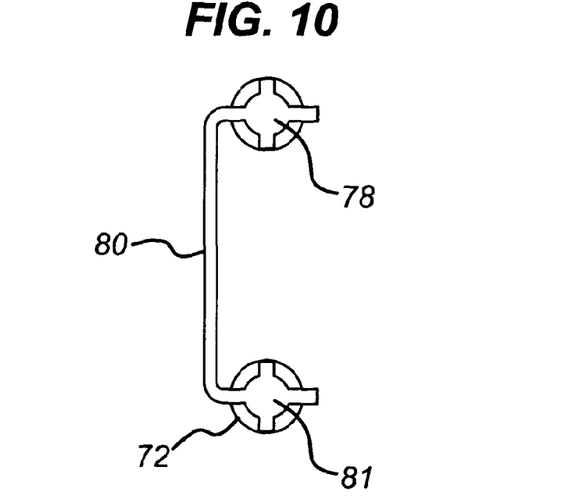
FIG. 10 is an end view of the locating assembly of FIG. 7.

The ball retainer 74 comprises a channel shaped member having a web 80 and a pair of flanges 81. As is best seen in FIGS. 7 and 10, each flange 81 has an increased thickness relative to the web. Each flange 81 also includes a plurality of apertures 82 therethrough. The increased thickness of the flanges 81 means that a cross section of the flanges forms the flat faces 78 of the contact elements 76, and the apertures 82 separate the contact elements 76 from one another. In use, the bearing balls 72 are located within the apertures 82. In the embodiment shown, each flange has a cross-shaped cross-section. Such a cross-section provides both the flat faces and increased strength. However, other cross-sections are possible.

The ball retainer 74 may be formed from any self-lubricating material such as sheet, cast or sintered bearing materials with lubricating additives, such as carbon, graphite, boron nitride, bronze, brass, pom, ptfe and alloys thereof.

Figure 11:
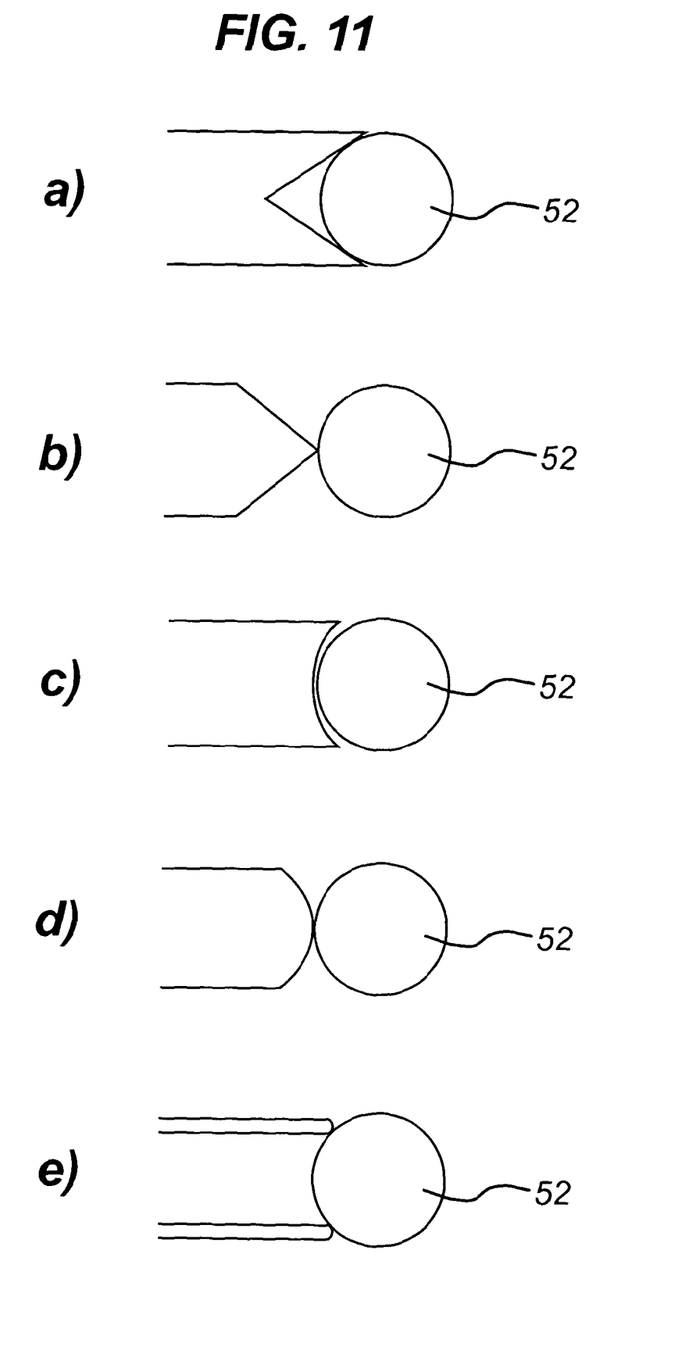
FIG. 11 is cross-sectional view taken along the first axis of contact between possible contact faces and bearing balls according to the present invention.

Although the embodiments described all have flat contact faces, a number of other contact faces are possible. FIG. 11 shows examples of cross sections taken along the first axis showing contact between alternative shape contact faces and bearing balls 52. FIG. 11a) shows a contact face formed from the inner surface of a cone. FIG. 11b) shows a contact face formed from the outer surface of a cone. FIG. 11c) shows a concave contact face. FIG. 11d) shows a convex contact face. FIG. 11e) shows a contact face formed by a tubular contact element.

It will be appreciated that the embodiments described in detail have been described by way of example only, and that alterations or modifications may be made within the scope of the invention as defined in the claims.

The invention claimed is:

1. A locating assembly for use with a sliding support comprising first and second elongate slide members slidable relative to one another in a first direction, wherein the locating assembly comprises:
    a plurality of bearing balls arranged with their centers aligned along a first axis,
    a plurality of contact elements, each contact element including at least one contact face, wherein adjacent of the plurality of bearing balls are separated by a respective one of the plurality of contact elements, and at least one of the contact elements is formed from a self-lubricating material which, in use, deposits and spreads a lubricating substance into a working environment of the locating assembly, wherein each of the plurality of contact elements comprises a cylindrical portion and first and second opposite end faces, wherein the first end face comprises the at least one contact face and the second opposite end face comprises a second contact face; wherein each contact element comprises a pair of pieces, wherein the first piece provides a first of the contact faces, and a second piece provides a second of the contact faces.

2. The locating assembly of claim 1, wherein each cylindrical portion has a constant diameter along its length.

3. The locating assembly of claim 1, wherein each cylindrical portion has a central section between two end sections along its cylindrical length, and where the central section is of reduced diameter relative to the two end sections.

4. The locating assembly of claim 1 further comprising a support portion for maintaining the contact elements in position and alignment relative to one another.

5. The locating assembly of claim 4 wherein the support portion is channel sectioned.

6. The locating assembly of claim 4 wherein the support portion is formed separately from the contact elements.

7. The locating assembly of claim 6 wherein the support portion and the contact element are formed from different materials.

8. The locating assembly of claim 7, wherein the support portion is formed from sheet, cast or sintered material with graphite coating or $SiO_2$ coating.

9. The locating assembly of claim 6 wherein:
    the support portion is channel sectioned, including a flange and a pair of tubular webs,
    each of the tubular webs comprises a plurality of separated tubular portions, and
    each of the tubular portions surrounds and grips a central section between two end sections along the cylindrical length of each of the contact elements.

10. The locating assembly of claim 9 wherein the central section of each of the contact elements is of reduced diameter relative to the end sections of each of the contact elements.

11. The locating assembly of claim 1 wherein each of the pieces comprises a first cylindrical portion having a first diameter and a second cylindrical portion having a second diameter.

12. The locating assembly of claim 1 wherein each contact element has a composite form, including a central strengthening portion formed of a first material, surrounded by an outer lubricating portion formed of a second material.

13. A sliding support comprising:
    first and second elongate slide members slidable relative to one another in a first direction;
    and
    the locating assembly of claim 1 positioned between the first slide member and the second slide member to locate and align the first slide member and the second slide member for sliding relative to one another in the first direction without contact therebetween.

14. The sliding support of claim 13 wherein no grease or further lubrication is applied to the locating assembly.

15. The sliding support of claim 13 wherein:
the first elongate slide member is of channel section defining a first web and first and second flanges,
the second elongate slide member is of channel section defining a second web and third and fourth flanges,
a first row of bearing balls is positioned between the first and third flanges, and
a second row of bearing balls is positioned between the second and fourth flanges.

16. The sliding support of claim 13 wherein the sliding support further includes an intermediate member, and:
the first elongate slide member is of channel section defining a first web and first and second flanges,
the second elongate slide member is of channel section defining a second web and third and fourth flanges,
the intermediate member is positioned between the first and second elongate slide members,
the locating assembly includes first and second parallel rows of bearing balls and is positioned between the first slide member and the intermediate member to locate and align the first slide member and the intermediate member for sliding without contact therebetween, and further comprising:
a second locating assembly including third and fourth parallel rows of ball bearings positioned between the second slide member and the intermediate member to locate and align the second slide member and the intermediate member for sliding without contact therebetween.

17. The sliding support of claim 13 wherein the contact elements are held in place between the bearing balls by the slide members and any intermediate members, without the need for an additional support portion.

18. The sliding support of claim 13, wherein the self-lubricating material comprises graphite.

19. The sliding support of claim 13, wherein the bearing balls are not held in fixed position relative to the contact elements.

20. The sliding support of claim 19, wherein each of the bearing balls and contact elements can float relative to one another, and independently relative to the slide members.

21. The locating assembly of claim 1, wherein the self-lubricating material comprises graphite.

22. The locating assembly of claim 1, wherein the bearing balls are not held in fixed position relative to the contact elements.

23. The locating assembly of claim 22, wherein each of the bearing balls and contact elements can float relative to one another, and independently relative to the slide members.

* * * * *